United States Patent
Saunders et al.

(10) Patent No.: US 9,083,762 B2
(45) Date of Patent: Jul. 14, 2015

(54) SYSTEM AND METHOD FOR PROVIDING HYBRID ON DEMAND SERVICES TO A WORK UNIT

(76) Inventors: Greg Saunders, Burlington (CA); Francis Beaudet, Gatineau (CA); M. Maxime Julien, Mont-Royal (CA)

( * ) Notice: Subject to any disclaimer, the term of this patent is extended or adjusted under 35 U.S.C. 154(b) by 1051 days.

(21) Appl. No.: 13/118,538

(22) Filed: May 30, 2011

(65) Prior Publication Data

US 2011/0296013 A1    Dec. 1, 2011

Related U.S. Application Data

(60) Provisional application No. 61/349,479, filed on May 28, 2010.

(51) Int. Cl.
| G06F 15/173 | (2006.01) |
| H04L 29/08 | (2006.01) |
| G06F 17/30 | (2006.01) |

(52) U.S. Cl.
CPC ...... H04L 67/2852 (2013.01); G06F 17/30581 (2013.01); H04L 67/10 (2013.01)

(58) Field of Classification Search
CPC ... G06F 15/16; G06F 15/173; G06F 11/2056; H04L 67/10
USPC ................................................. 709/200, 224
See application file for complete search history.

(56) References Cited

U.S. PATENT DOCUMENTS

| 7,209,060 B2 * | 4/2007 | Kumar et al. ............. 341/118 |
| 7,426,571 B2 * | 9/2008 | Chadalavada ............ 709/235 |
| 7,461,130 B1 * | 12/2008 | AbdelAziz et al. ....... 709/208 |
| 7,478,381 B2 * | 1/2009 | Roberts et al. ........... 717/168 |
| 7,685,285 B2 * | 3/2010 | Yamakoshi et al. ...... 709/226 |
| 8,099,469 B2 * | 1/2012 | Furtner et al. ........... 709/208 |
| 8,196,133 B2 * | 6/2012 | Kakumani et al. ....... 717/172 |
| 8,219,598 B1 * | 7/2012 | Appleton et al. ........ 707/824 |
| 8,570,989 B1 * | 10/2013 | Mahler et al. ............ 370/338 |
| 2002/0065879 A1 * | 5/2002 | Ambrose et al. ......... 709/203 |
| 2002/0198952 A1 * | 12/2002 | Bell .......................... 709/208 |
| 2004/0143647 A1 * | 7/2004 | Cherkasova .............. 709/219 |

(Continued)

FOREIGN PATENT DOCUMENTS

| WO | WO 2011/002777 | 1/2011 |
| WO | WO 2011/011540 | 1/2011 |

*Primary Examiner* — Anthony Mejia
(74) *Attorney, Agent, or Firm* — Benoit & Cote Inc.

(57) ABSTRACT

The present document describes a method and system for providing Hybrid On Demand (HOD) software and/or data to a plurality of normal nodes associated with a work unit. The normal nodes are serviced via two or more parent nodes using different communication networks. Normal nodes, which are connected to the Local Area Network (LAN) of the work unit, may receive software and/or data services from a local node via the LAN, and normal nodes which are outside of the LAN may receive software and/or data services from a SUPR node via a Wide Area Network (WAN) such as the internet. After synchronization with one the normal nodes, the parent nodes synchronize the updated data with each other, and then they push the updated data to all the normal nodes associated with the work unit to mirror the same data on all the normal nodes. Frequencies of synchronization and provision of software and/or data services and/or updates is governed by a set of synchronization rules that are embedded in the business layer of the nodes. This scenario may also be used for synchronizing data in a cache cloud manner between the different nodes of the wide and the local networks.

10 Claims, 9 Drawing Sheets

(56) References Cited

U.S. PATENT DOCUMENTS

| | | | |
|---|---|---|---|
| 2005/0203968 A1* | 9/2005 | Dehghan et al. | 707/203 |
| 2006/0150014 A1* | 7/2006 | Chadalavada | 714/18 |
| 2006/0221987 A1* | 10/2006 | Polson | 370/402 |
| 2006/0250301 A1* | 11/2006 | Yamakoshi et al. | 342/357.1 |
| 2007/0050464 A1* | 3/2007 | Chin | 709/208 |
| 2007/0104169 A1* | 5/2007 | Polson | 370/338 |
| 2007/0143398 A1 | 6/2007 | Graham | |
| 2007/0169079 A1* | 7/2007 | Keller et al. | 717/168 |
| 2008/0130639 A1* | 6/2008 | Costa-Requena et al. | 370/389 |
| 2008/0162587 A1* | 7/2008 | Auer et al. | 707/201 |
| 2008/0209413 A1* | 8/2008 | Kakumani et al. | 717/172 |
| 2009/0081951 A1* | 3/2009 | Erdmann et al. | 455/41.2 |
| 2010/0095293 A1* | 4/2010 | O'Neill et al. | 717/173 |
| 2010/0175058 A1* | 7/2010 | Radin et al. | 717/168 |
| 2011/0280175 A1* | 11/2011 | Yamada et al. | 370/315 |
| 2013/0024539 A9* | 1/2013 | Khedouri et al. | 709/217 |
| 2013/0091123 A1* | 4/2013 | Chen et al. | 707/722 |
| 2014/0136599 A1* | 5/2014 | Shiue et al. | 709/203 |
| 2014/0282487 A1* | 9/2014 | O'Neill et al. | 717/173 |

* cited by examiner

SYSTEM AND METHOD FOR PROVIDING HYBRID ON DEMAND SERVICES TO A WORK UNIT

CROSS-REFERENCE TO RELATED APPLICATIONS

This application claims priority from U.S. Ser. No. 61/349,479 filed on May 28, 2010 which is incorporated herein by reference.

TECHNICAL FIELD

This description relates to the field of cloud computing in healthcare systems. More particularly, the description relates to data synchronization and software delivery for a work unit.

BACKGROUND

Cloud computing is internet-based computing, whereby shared resources, software and information are provided to computers and other devices on-demand, like a public utility.

Software as a service (SaaS) is a model of software deployment over the internet. With SaaS, a provider licenses an application to customers for use as a service on demand. According to the SAAS model: 1—The application is hosted in an Internet data center and not on the customer's premise; and 2—Multi-tenant in that multiple customers are served simultaneously in one instance of the application. Its advantages include saving money by not having to purchase servers or other software to support use (everything runs from the browser); flexibility; scalability etc. Its shortcomings include the dependency on an internet connection, security concerns, lack of features etc.

The alternative to SAAS is desktop software, one complete software application license per device/machine.

Another model is known as the Client-Server model. The client-server characteristic describes the relationship of cooperating programs in an application. The server component provides a function or service to one or many clients, which initiate requests for such services. In this circumstance, data is stored on a server, there is ease of maintenance (software updates, data backup) and controlled access with appropriate permissions. Furthermore, simultaneous requests can overload the server.

In the peer-to-peer model, each host or instance of the program can simultaneously act as both a client and a server, and each has equivalent responsibilities and status.

In the Caching model, a component that improves performance by transparently storing data such that future requests for that data can be served faster. Hardware implements cache as a block of memory for temporary storage of data likely to be used again. CPUs and hard drives frequently use a cache, as do web browsers and web servers. To be cost efficient and to enable an efficient lookup of data, caches are comparably small. Nevertheless, caches have proven extremely effective in many areas of computing because access patterns in typical computer applications have locality of reference. References exhibit temporal locality if data is requested again that has been recently requested already. References exhibit spatial locality if data is requested that is physically stored close to data that has been requested already.

The Peer-to-peer (P2P) Caching is yet a further model. P2P caching involves creating a cache—or temporary storage space—for P2P data, using specialized communications hardware, disk storage and associated software. This cache is placed in the ISP's network, either co-located with the Internet transit links or placed at key aggregation points or at each cable head-end. Once a P2P cache is established, the network will transparently redirect P2P traffic to the cache, which either serves the file directly or passes the request on to a remote P2P user and simultaneously caches that data for the next user.

SUMMARY

According to an aspect, the method described herein allows for the best of both traditional SAAS models and Client/Server models. It is subscription-based with a low IT footprint (i.e., no backup hardware or servers are required) and provides a rich client experience with the ability to work in an offline mode. Small practices/work units (e.g., medical clinics) do not want high cost solutions, but also do not want to be dependent on a continuous internet/intranet connection. The layered approach of introducing a Local node for local syncs within a work unit offloads the requirement for synchronizing with the central node thereby allowing for increase scalability of the SAAS model.

According to an embodiment, there is provided a method for providing Hybrid On Demand (HOD) software and data services to a plurality of normal nodes associated with a work unit. The method comprises:
  providing normal nodes which are connected to a local area network (LAN) of the work unit with at least one of software and data services from a local node connected to the LAN, the local node acting as the parent node of the normal nodes connected to the LAN;
  providing normal nodes which are outside of the LAN with at least one of software and data services from a SUPR node using a wide area network, the SUPR node acting as the parent node of the normal nodes outside the LAN;
  determining whether a connection between the local node and the SUPR node is functional; and
  regardless of the functionality of the connection, synchronizing the at least one of software and data services between the local node and the normal nodes connected to the LAN;
  upon determining that the connection between the local node and the SUPR node is functional, synchronizing the at least one of software and data services between the local node and the SUPR node and mirroring the synchronized at least one of software and data services on all normal nodes associated with the work unit.

According to an embodiment, the method further comprises determining whether a local node is functional and upon determination that the local node is not functional, synchronizing the at least one of software and data services of the normal nodes with the SUPR node.

According to an embodiment, the mirroring further comprises pushing updated data from at least one of the local node and SUPR node to all of the normal nodes after synchronizing the local node with the SUPR node.

According to an embodiment, the method further comprises: synchronizing the SUPR node with different local nodes of different work units; and filtering data pertaining to other work units from synchronization.

According to an embodiment, the method further comprises: assigning an identity (ID) to each of the normal nodes and local node of each work unit; identifying the work unit to which the nodes belong based on the ID of the nodes; and synchronizing only the data associated with the work unit to which the nodes belong.

According to an embodiment, the method further comprises: assigning more than one ID to each normal node;

linking each ID of the normal node to a login information used for authentication; whereby, one normal node may be used with more than one work unit without transferring data pertaining to one work unit to another work unit.

According to an embodiment, the method further comprises governing frequencies of software and data service provision and synchronization by a set of synchronization rules embedded in each of the normal nodes, local node, and SUPR node.

According to an embodiment, the method further comprises providing a user interface (UI) and configuring HOD as a service running independently of whether a user is logged into the UI or not.

According to an embodiment, the normal nodes comprise computing devices.

According to an embodiment, the wide area network comprises the internet, a wireless network, or a combination thereof.

According to an embodiment, there is provided a method for synchronizing data in a cache cloud environment comprising client nodes associated with a work unit and parent nodes, the parent nodes comprising a SUPR node accessible via a wide area network (WAN) and a local node accessible via a local area network (LAN). The method comprises:
  searching for closest parent node when new data is available at one of the client nodes;
  synchronizing new data with the closest parent node;
  synchronizing parent nodes with each other;
  pushing new data to all client nodes of the work unit.

According to an embodiment, synchronizing new data comprises when the closest parent node is local node but does not contain the data, getting the data from the SUPR node.

According to an embodiment, the method further comprises synchronizing client nodes outside the LAN with the SUPR node, and synchronizing client nodes within the LAN with the local node.

According to an embodiment, the parent nodes include more than SUPR node accessible via the WAN, the method comprising synchronizing client nodes outside the LAN with the least busy SUPR node.

According to an embodiment, the method further comprises: synchronizing the SUPR node with at least one of client nodes and local nodes of different work units; and filtering data pertaining to other work units from synchronization.

According to an embodiment, the method further comprises: assigning an identity (ID) to each of the normal nodes and local node of each work unit; identifying the work unit to which the nodes belong based on the ID of the nodes; and synchronizing only the data associated with the work unit to which the nodes belong.

According to an embodiment, the method further comprises governing frequencies of synchronization by a set of synchronization rules embedded in the client nodes and parent nodes.

According to an embodiment, there is provided a method for synchronizing data in a cache cloud manner between a central node and plurality of nodes including a local node and normal nodes. The method comprises associating the normal nodes and the local node with a first local area network, synchronizing the normal nodes with the local node using the first local area network, and synchronizing the local node with the central node using the wide area network. When synchronization of the normal nodes with the local node is not possible, synchronization of the normal nodes is effected with the central node using a wide area network.

According to an embodiment, the method further comprises synchronizing the central node with nodes of a second local area network. The step of synchronizing may further comprise allocating a storage space at the central node for each local area network for storing synchronization data associated with each local area network separately. In a further embodiment, the method further comprises determining the local area network to which the normal/local node belongs based on an identity of the normal/local node, and synchronizing only the data associated with that local area network.

The wide area network may be the internet, a wireless network, or a combination thereof.

In an embodiment, the normal nodes and the local node are computing devices and the local area network belongs to a work unit such as a medical clinic.

In another aspect, there is provided a method for providing Hybrid On Demand (HOD) software services to a plurality of normal nodes. The method comprises providing software services to the normal nodes from a local node using a local area network, and synchronizing the local node with a central node using a wide area network when access is available. When providing software services from the local node is not possible, software services are provided to the normal nodes from the central node using the wide area network.

In an embodiment, the updates, the provision of software services and the synchronization between nodes is governed by a set of synchronization rules embedded in the nodes.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present document describes a method and system for providing Hybrid On Demand (HOD) software and/or data to a plurality of normal nodes associated with a work unit. The normal nodes are serviced via two or more parent nodes using different communication networks. Normal nodes which are connected to the Local Area Network (LAN) of the work unit may receive software and/or data services from a local node via the LAN, and normal nodes which are outside of the LAN may receive software and/or data services from a SUPR node via a Wide Area Network (WAN) such as the internet. After synchronization with one the normal nodes, the parent nodes synchronize the updated data with each other, and then they push the updated data to all the normal nodes associated with the work unit to mirror the same data on all the normal nodes. Frequencies of synchronization and provision of software and/or data services and/or updates is governed by a set of synchronization rules that are embedded in the business layer of the nodes. This scenario may also be used for synchronizing data in a cache cloud manner between the different nodes of the wide and the local networks.

In the present document, the term "node" should be interpreted to mean a network element such as computer, server, portable device, etc.

Figure 1:
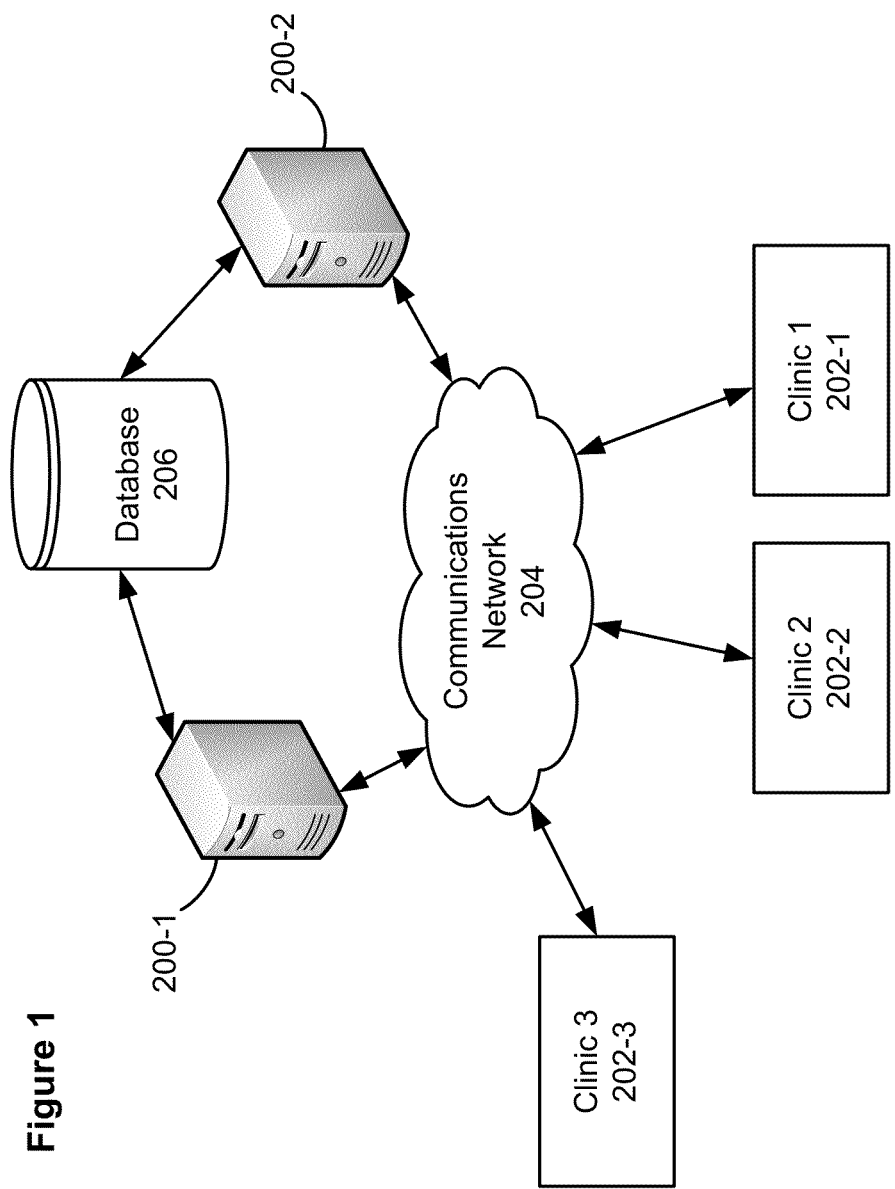
FIG. 1 illustrates an embodiment of a system for providing HOD software and/or data services to one or more clinics.

FIG. 1 illustrates an embodiment of a system for providing HOD software and/or data services to one or more clinics. As shown in FIG. 1, one or more Single Unified Patient Record nodes 200 (SUPR) provide software and/or data services to one or more clinics 202 via a communication network 204 such as the internet or any other wide area network. The SUPR nodes 200 have access to the same database 206. For clarity purposes, the following embodiments will be described with reference to one clinic and one SUPR node, in a non-limiting implementation.

Figure 2:
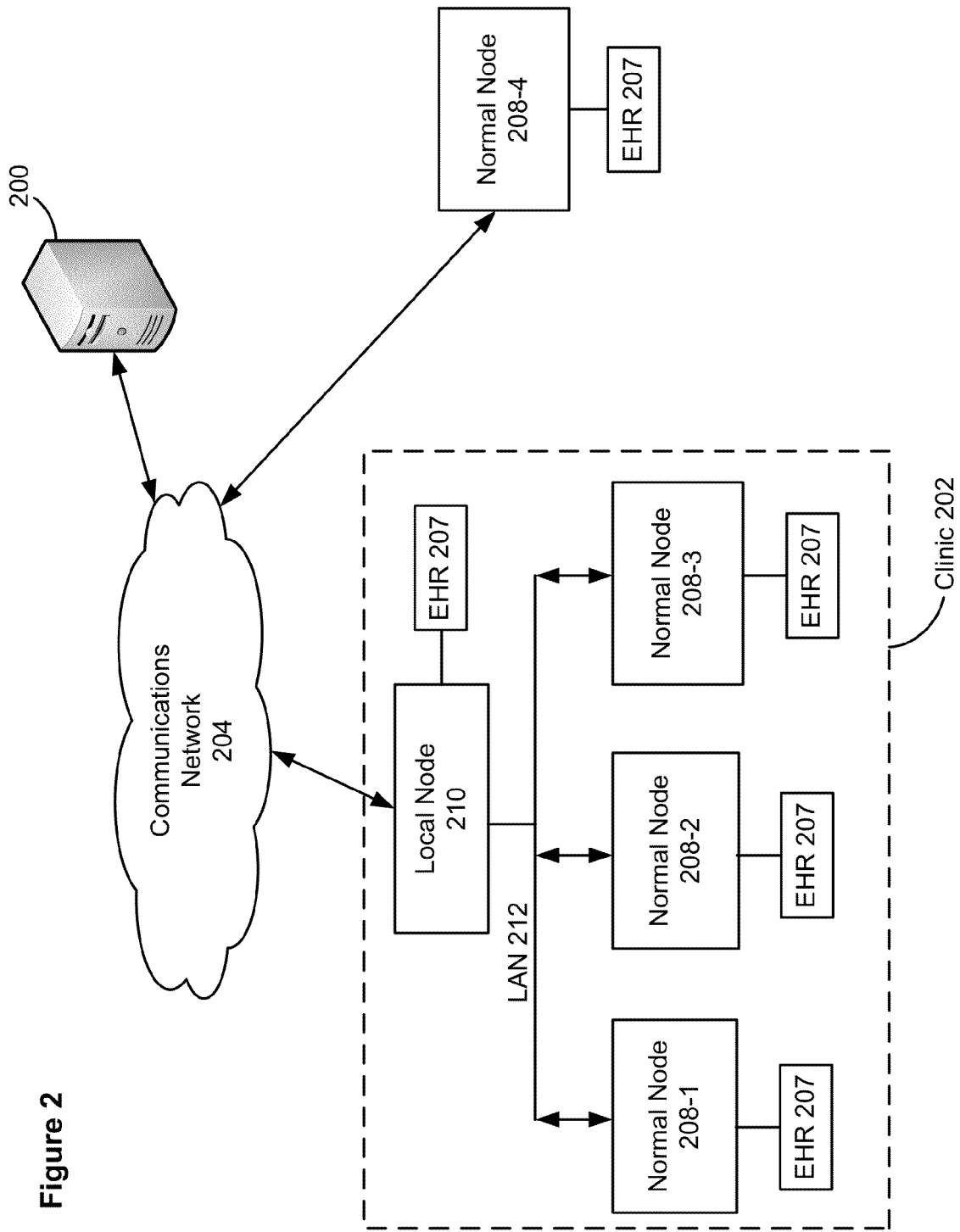
FIG. 2 illustrates the node topology of an HOD system in accordance with the present embodiments.

FIG. 2 illustrates the node topology of an HOD system in accordance with the present embodiments. In the embodiment of FIG. 2, the clinic 202 includes a plurality of normal nodes 208 such as a physician's computer, and a local node 210 such as a local server. The normal nodes 208 communicate with the local node 210 using a local area network LAN 212. Physicians enter new information into the system using an Electronic Health Record (EHR) application 207 (aka GUI 207) which serves as a user interface.

In an embodiment, it is possible to have two or more locations for the same clinic and share the same data between the different locations. In this case, two or more local area networks would be required with different local nodes.

In general, all the HOD nodes are similar regardless of whether or not they are "local" nodes, "normal" nodes, or a "SUPR" node. All three node types contain mostly the same set of services, running the same set of code with some exceptions; for example the SUPR node does not contain a "Hardware Services" and the local node will not contain import or export services. These will be handled via the SUPR Node. Further, the SUPR Node contains a synchronization filter and scope, which will only allow incoming connections to access data for their tenant account. This is analogous to how a firewall filters network traffic, and represents the main constraint preventing clinics from accessing each other's data, such as in the system of FIG. 1 where the same SUPR node 200 provides software and data services to more than one clinic 202.

The HOD software portion on both the SUPR Node and Local/Normal Nodes is designed as a Service Oriented Architecture. The Practice Management Application (PMA) leverages the various services exposed by the HOD. The advantage of this design is that the GUI 207 is not tightly coupled to the synchronization logic and data sources. Creating new updated user interfaces involves replacing a smaller set of code. It also allows many different types of user interfaces to leverage the services, such as a web application, thin mobile device clients, etc.

Referring back to FIG. 2, when a normal node 208 has new data to synchronize, it will search for the closest available parent to synchronize with. For example, if the normal node 208 is within the LAN 212 of the clinic 202 such as one of normal nodes 208-1 to 208-3, it will synchronize with the local node 210. Subsequently, the local node 210 will synchronize with the SUPR node 200 via the communications network 204, and push the information to all of the normal nodes 208-1 to 208-3 within the LAN 212. After the synchronization with the local node 210, the SUPR node 200 will also push the information to the normal node 208-4 via the communication network 204. Whereby, the updated information is mirrored on all the normal nodes 208 within the LAN 212 and outside of it. This is particularly important in the healthcare system to make the information pertaining to each client available to each physician who is a member of the same clinic. For example, each physician needs to know the medications already prescribed to the patient to avoid prescribing new medications which contradict or affect the effectiveness of the previously prescribed ones etc.

On the other hand, if a normal node 208-4 is outside the LAN 212, such as when the doctor is working from home or accessing the EHR 207 from a hotspot, the normal node's closets parent would be the SUPR node 200. If the normal node has new information, it would synchronize the new information with the SUPR node 200 via the communications network 204. Subsequently, the SUPR node 200 would synchronize with the local node 210, and the local node 210 would push the new information down to the normal nodes 208-1 to 208-3. Whereby, the normal nodes 208-1 to 28-3 would have the same information as the normal node 208-4 which is outside of the clinic 202.

In summary, when the new information is created at a normal node 208 within the LAN 212, the normal node 208 would synchronize with the local node 210. Subsequently, the local node 210 would synchronize the new information with the SUPR node 200 via the communications network 204. Each of the SUPR node 200 and normal node 210 would then push the updated information to the normal nodes 208 connected thereto. Similarly, when the information is created at a normal node 208 outside the LAN, the normal node 208 would synchronize the new information with the SUPR node 200, then the SUPR node 200 would synchronize the new data with the local node 210 and the local node would push the information down to the normal nodes 208 within the LAN 212. There is no direct communications between normal nodes.

In an embodiment, nodes within a clinic 202 are made aware of each other via a peer discovery protocol, while the SUPR node(s) 200 are gathered from a predefined list. This technology allows SaaS based applications to be cached to local tenants, and operate in a "cache cloud" mode, which is unique for SaaS based systems. The syncing of data between nodes is controlled by the SyncManager. The SyncManager is a class that runs on the HOD and is responsible for managing all sync jobs in its queue.

In an embodiment, sync jobs are added to the sync queue when:
  1. A user is added—Sync Users Job;
  2. A session is updated (login);
    a. If Parent is SUPR, a sync job is created every 60 sec, to keep in sync with the SUPR;
    b. If Parent is LOCAL, only 1 sync job created then to maintain in sync it relies on data changes sync jobs;

3. Parent Node Changed (i.e., Normal's parent was Local node, but when Doctor leaves clinic the new parent becomes the SUPR node);
4. On Data Changed (any change to an entity that is persisted).

The "SUPR Node" 200 is multi-tenant, where as the normal nodes 208 and Local Node 210 are not. The solution may be architected and implemented on the Microsoft platform stack. The Microsoft platform stack integrates well, and provides most of the components that are needed to be integrated for the solution.

In an embodiment, the user/physician does not have to be logged-in the EHR application 207 for the HOD service to serve synchronization requests from its peers. HOD is configured as a service running independently from the EHR application 207.

This technology allows SaaS based applications and data to be cached to local tenants, and operate in a "cache cloud" mode, which is unique for SaaS based systems. The main advantage of the technology described in this embodiment, is that software and data services may be provided to the normal nodes (users) even when one of the networks (wide area network and local area network) is not available. It is important to note that from the user's (normal or local node) standpoint the system functions normally even in the absence of a connection to one of the networks. That is, if no connection to internet (wide area network) is available the normal nodes can obtain software and data services from the local node because the information stored in the central node which is accessible via the internet is also mirrored on the local node which is accessible via the local area network. Similarly, a normal node which is outside the local area network may still obtain software and data services from the central node via the internet. When the connection between local area network and the wide area network is re-established, synchronization of the local node with the central node occurs to mirror the updates/changes that occurred since the last synchronization.

Figure 3:
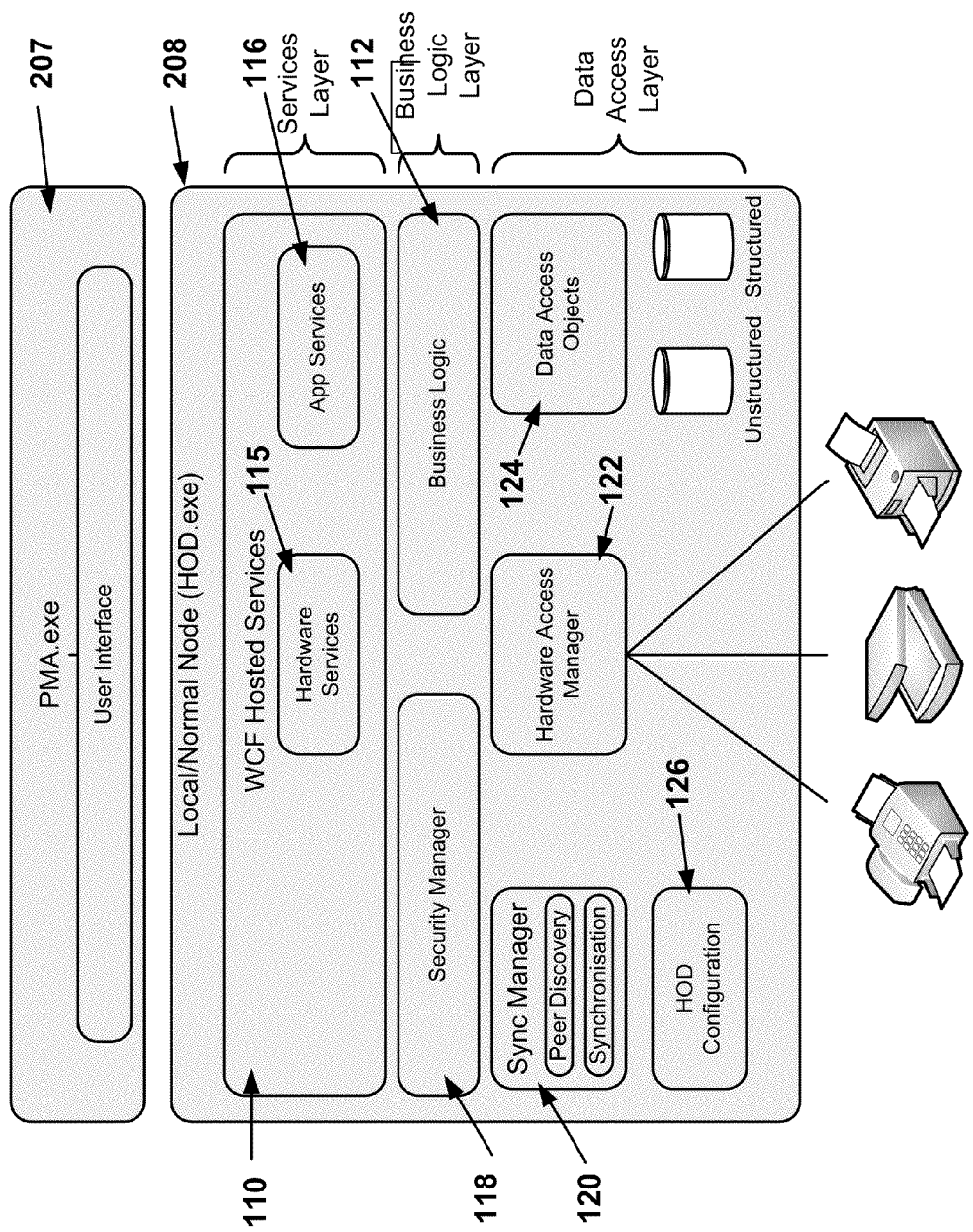
FIG. 3 is a block diagram representation of the normal node and local node of the hybrid on demand system according to an embodiment.
Figure 4:
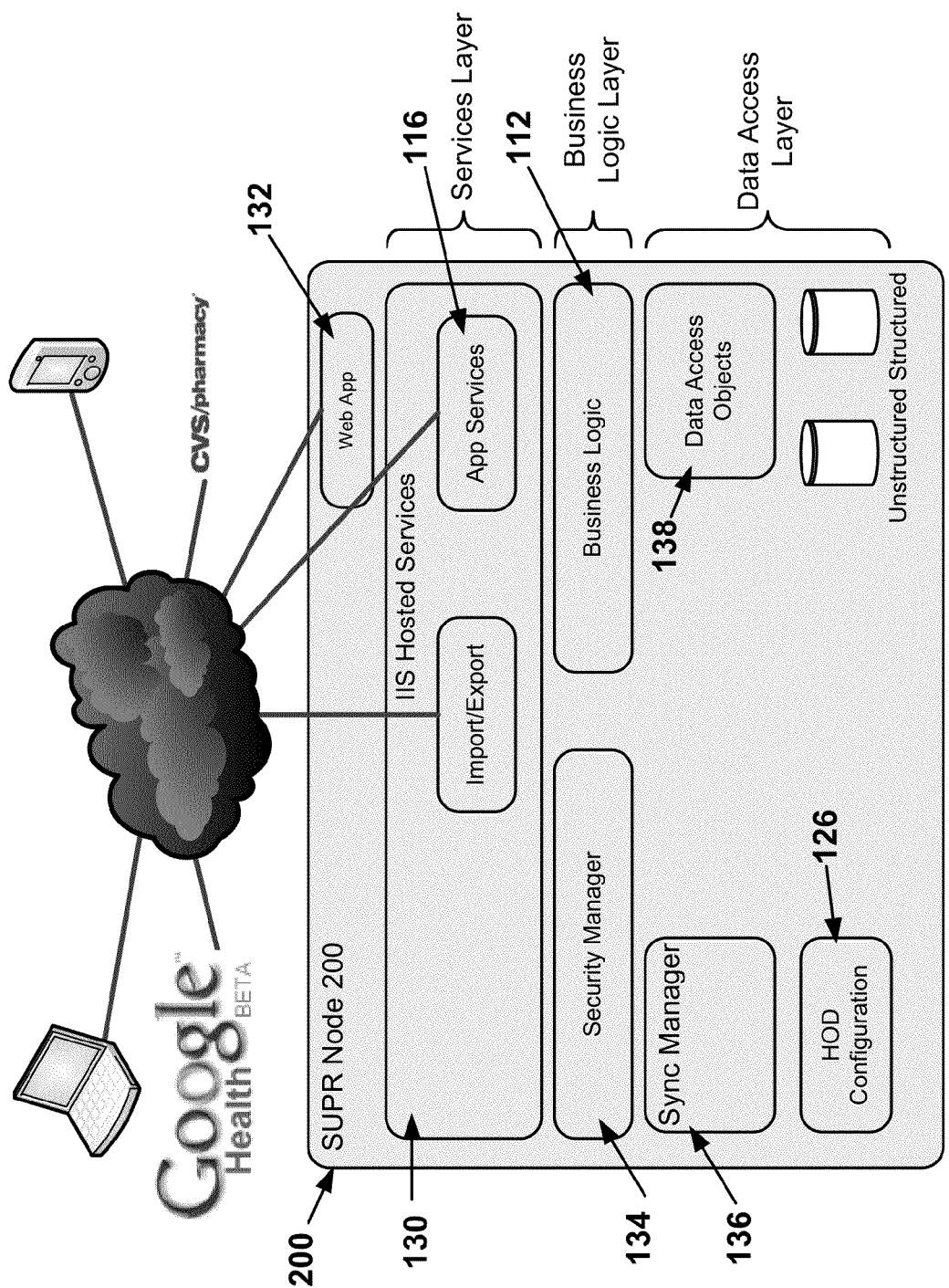
FIG. 4 is a block diagram representation of the SUPR node of the hybrid on demand system according to an embodiment.

FIG. 3 is a block diagram representation of the normal node and local node of the hybrid on demand system according to an embodiment, and FIG. 4 FIG. 3 is a block diagram representation of the SUPR node of the hybrid on demand system according to an embodiment.

Now referring to FIG. 3, the local node 210 (i.e., typically the receptionist's desk) or normal node 208 (i.e., typically a TabletPC) differs from the Super node 200 in terms of how they are implemented, and their scope. While much if not all the code will be the same at the service layer, the services exposed on the local/normal nodes are running as a Windows Communication Framework (WCF) 110 hosted service. This component will leverage the WCF 110 to manage communications between the user interface 107 and the synchronization logic 112. WCF 110 exposes services seamlessly whether as a local application, or as a web service. The "Application Services" 116 component implements all the user, scheduling and related services for the EHR application 207. These will be implemented in a service facade pattern. Examples of potential application services are: User Management; Tenant Management; Billing; Scheduling; etc.

The Security Manager 118 is responsible for user authentication, database security, and encrypted communications with other HOD nodes. Further, the security manager 118 will be responsible for deciding what rights to data a particular user may have. It will not be responsible for auditing, as that will fall to another component. It is responsible for: Login/Authentication/Identification; Access permissions; Session Management and expiration; Creating secured connections to other HOD nodes; Database key ring management; and File encryption key management.

The Synchronization Logic 112 represents the core business intelligence of the system and handles the synchronization rules. The synchronization manager 120 is responsible for the following items: Establishing connections to parent HOD node(s) as needed; Configuring the type of data to synchronize; Leveraging the MS Sync Framework to do the work of synchronization; and Maintaining an up-to-date state by performing sync in real time. The synchronization manager will also be responsible for keeping a working window of data in the node's database, while retaining the security of sensitive data. The data to be synchronized will cover all appointments and medical records needed for use by a tenant.

While the Microsoft Sync Framework does provide a concept of filtering, such that all nodes do not obtain every piece of data, this mechanism alone does not provide for security and isolation between tenants or clinics. For this reason, the SUPR node 200 includes a custom Sync Provider written that grants access to data based on the credentials of the user logged in. Filtering will still be used for determining the data to be synchronized.

During the peer discovery process, a normal/local node will identify local peers (other HOD nodes on the same physical LAN), and query them for current status. Peers will be discovered on the local network by issuing a multicast request for identification. Any peer HOD node on the network will be required to respond with its ID and node type (SUPR, Local or Normal). In the event that no local node responds within a configured set of time, a SUPR node 200 will be used. In the case where more than one SUPR node 200 is used such as in the example of FIG. 1, load balancing hardware may be used to direct the request to the least busy SUPR node 200 available on the network. Each SUPR node 200 will use the same database server 206, thus ensuring each synchronization connection represents the same data (see FIG. 1).

When a user first logs into the EHR 207, synchronization with a parent node will be initiated. Local nodes 210 will attempt to sync with the SUPR node 200. Normal nodes 208 will attempt to sync with a Local node 210. If this fails, then they will synchronize with the SUPR node 200. This initial sync is to get the operating data for the node, and will happen in the background to not block the user. Synchronization will continue to occur in real time as updates relevant to each user's data set occur.

Figure 5:
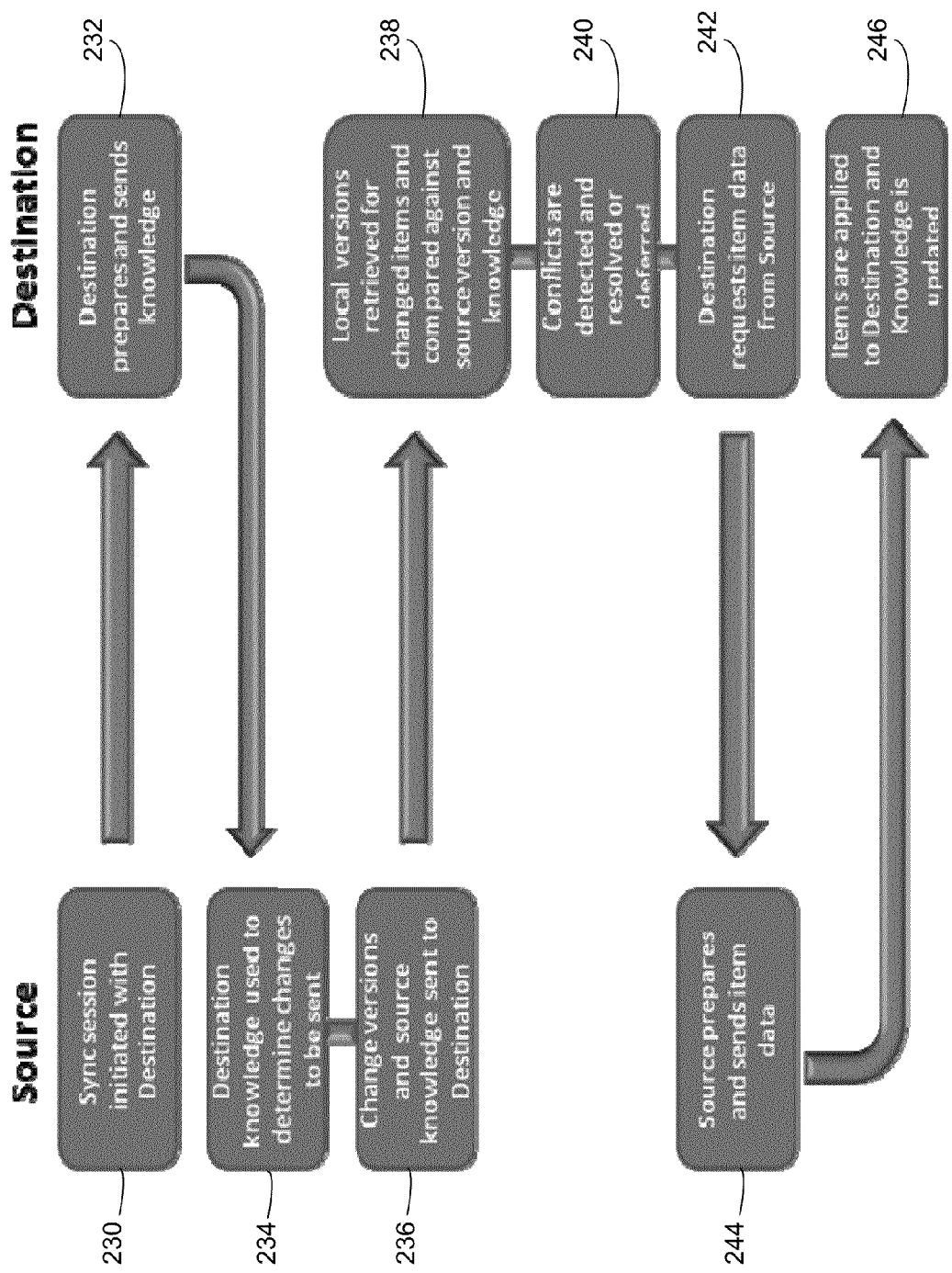
FIG. 5 illustrates the synchronization steps between a source and a destination, in accordance with an embodiment.

FIG. 5 illustrates the synchronization steps between a source and a destination, in accordance with an embodiment. The synchronization session is initiated with the destination at step 230. At step 232, the destination prepares and sends knowledge to the source. The knowledge includes the metadata, or information which describes the item data in terms of its source, creation and update dates, size and changes. At step 234 the source uses the destination knowledge to determine changes to be sent to destination. At step 236, change versions and source knowledge are sent to the destination. At step 238, the local versions are retrieved for changed items and compared against source version and knowledge. At step 240 the conflicts are detected and resolved or deferred. At step 242 the destination requests item data from source. The source prepares the item data and sends them to the destination at step 244. The item data is the data itself such as a name or an address. The items are applied to destination and the knowledge is updated at step 246.

Referring back to FIG. 3, there is shown a data access object 124 which is a well known design pattern where an object provides an abstract interface over some type of database or other storage mechanism. This pattern provides a mapping from application calls to the persistence layer. This isolation addresses concerns of what data access the application actually needs, both in terms of domain specific objects and data types and how these needs can be addressed with the specific relational database.

The "HOD Configuration" 126 is a component that identifies the type of node and provides configuration options for the HOD node. The configuration options define the role and behavior the HOD Node will operate under.

Now referring to FIG. 4, there is shown a block diagram representation of the SUPR node 200 of the hybrid on demand system according to an embodiment.

The SUPR node 200 provides many of the same services as the local/normal nodes 210/208; one notable exception is the "Hardware Services" 115 node. The other key difference is that these services will be true web services, and such will be hosted via Internet Information Services IIS 130. This will allow normal load balancing and other strategies to be undertaken.

The "Application Services" 116 component implements all the user-related services for the EHR application 207. These will be implemented in a service facade pattern. Examples of potential application services are: User Management; Tenant Management; Billing; Scheduling; Reminders; Import/Export; etc.

The web application 132 will also be responsible for serving the administration UI, and other admin related functionality. In terms of ease of maintenance, some administrative functionality is implemented in ASP.NET. The web application 132 is only part of the SUPR node 200. The Web Application 132 includes, amongst others: Maintenance UI, and Patient portal.

The Security Manager 134 is responsible for user authentication, database security, and encrypted communications with other HOD nodes. Further, the security manager 134 will be responsible for deciding what rights to data a particular user may have. It will not be responsible for auditing, as that will fall to another component. It will be responsible for: Authentication; Access permissions; Session Management and expiration; Creating secured connections to other HOD nodes; Database key ring management; and File encryption key management.

The Synchronization Logic 112 represents the core business intelligence of the system. It handles the synchronization rules.

The SUPR Node synchronization manager 136 is a simpler version of the Local/Normal synchronization manager 120 in that it only passively listens for incoming synchronization requests. The Super Node synchronization manager 136 will be responsible for the following items: Accepting connections from HOD node(s) 208 and 210 as requested; Configuring the type of data to synchronize; and Leveraging the MS Sync Framework to do the work of synchronization.

Data Access objects 138 is a well-known design pattern where an object provides an abstract interface over some type of database or other storage mechanism. This pattern provides a mapping from application calls to the persistence layer. This isolation addresses concerns of what data access the application actually needs, both in terms of domain specific objects and data types and how these needs can be addressed with the specific relational database. The "HOD Configuration" 126 is a component that provides configuration options for the HOD SUPR node 200.

Security originates with the SUPR node 200 and emanates its policies between this node and the local and normal nodes 210 and 208. There are different types of security that needs to be taken into consideration, user account management, and auditing. These two sections will be covered in greater detail below. User management and access is a complex system due to the hybrid nature of the HOD having the ability to work offline as well as online. In designing the user management and user access a few principles needed to be ensured: 1—Subscribers that are working offline that previously had access to the system should not be denied access to the system and patient information if the password has been modified on the super/central node; 2—Authentication of username and password and or username and tenant certificate must be done when syncing with other nodes on the system; and 3—All transport between nodes must be done on a secure channel to ensure that the message being sent has not been tampered with.

Figure 6:
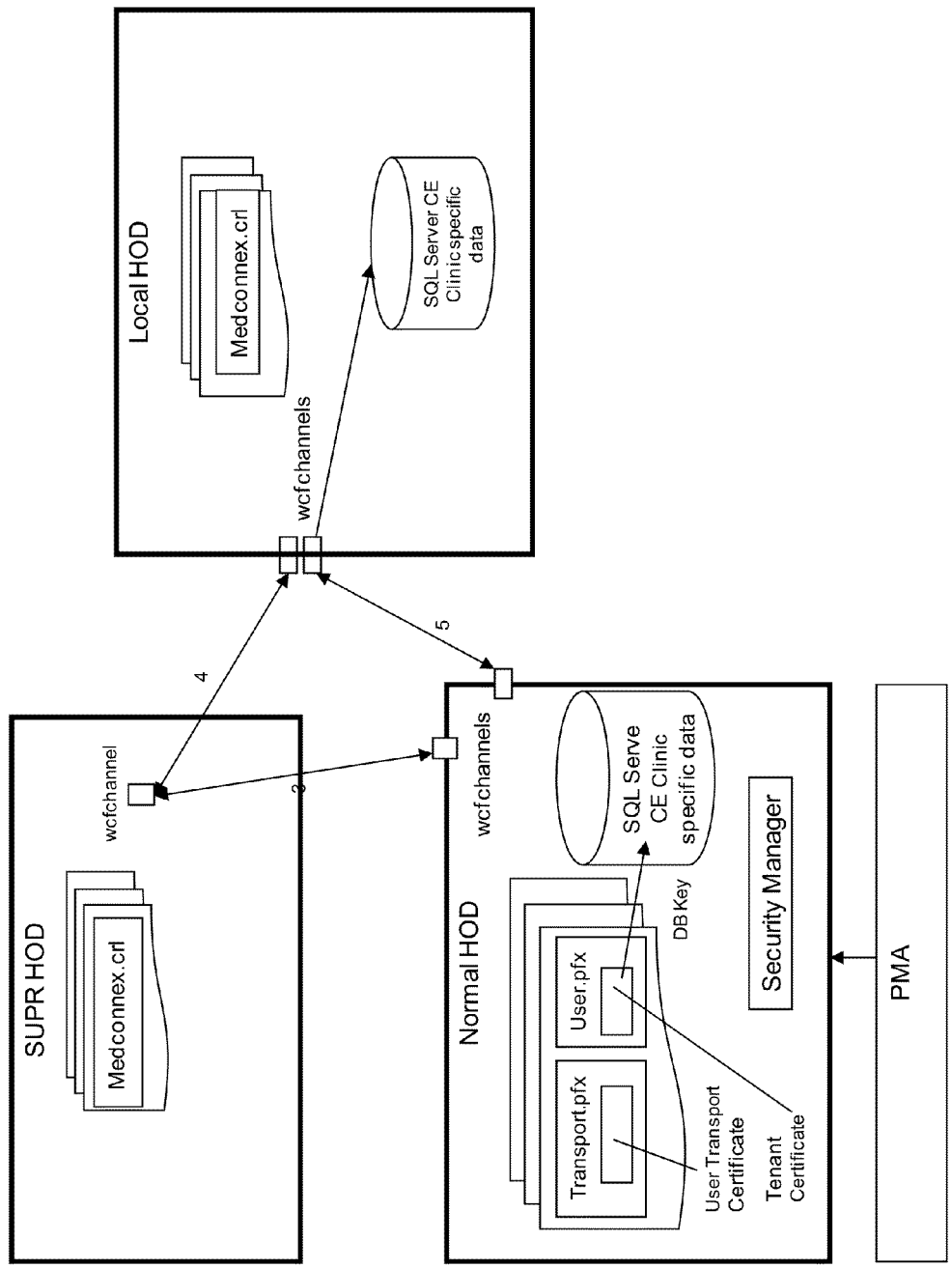
FIG. 6 is a block diagram illustrating the synchronization security setup between a SUPR node, a local node, and a normal node, in accordance with an embodiment.

FIG. 6 is a block diagram illustrating the synchronization security setup between a SUPR node, a local node, and a normal node, in an embodiment of the invention.

1) At login, the user (aka physician or tenant) enters his/her username and password using a GUI to get access to the PMA using a normal node. The PMA connects with the normal node and tries to authenticate to create a session for the user.
2) The Security Manager checks to see if the user.pfx and transport.pfx file is stored within the local file system. The PFX files are transport files for the tenant and user transport certificates. To access these two certificates a password must be supplied to the pfx file to unlock the file to gain access to the certificate.
3) If the Normal HOD does not have a user.pfx and/or transport.pfx file the security manager will open up a channel directly to the SUPR, authenticate itself with the username and password being supplied by the PMA and if successful will download the two files into the local file system. The user.pfx file after being unlocked gives the HOD access to the database since the tenant certificate is used to create a database key which in turn is used to unlock the encrypted database.
4) Between Steps 1-3 the local node in the past has already connected with the SUPR HOD and synced its data. During this sync it also downloads a CRL file (Certificate Revocation List) from the SUPR which lists certificates that should be rejected on the system. This is use to lock out users in a subscription based model.
5) Back to the normal node, after some time after login, the normal HOD will try to sync its data up with a parent node, in this case the Local HOD. It creates a WCF channel with SSL and binds the channel to the user transport certificate locked within the transport.pfx file. On the local HOD, during connection, validates this transport certificate against its transport certificate chain as well as the CRL file downloaded in step 4. If validation fails then the Normal HOD is rejected from syncing with the node.
6) If the validation of the transport certificate passes, the normal node passes the tenant certificate, locked within the user.pfx file, to unlock the database on the local HOD. In this way the Local HOD can ensure that the Normal HOD is assigned to the same tenant as the Local.

Figure 7:
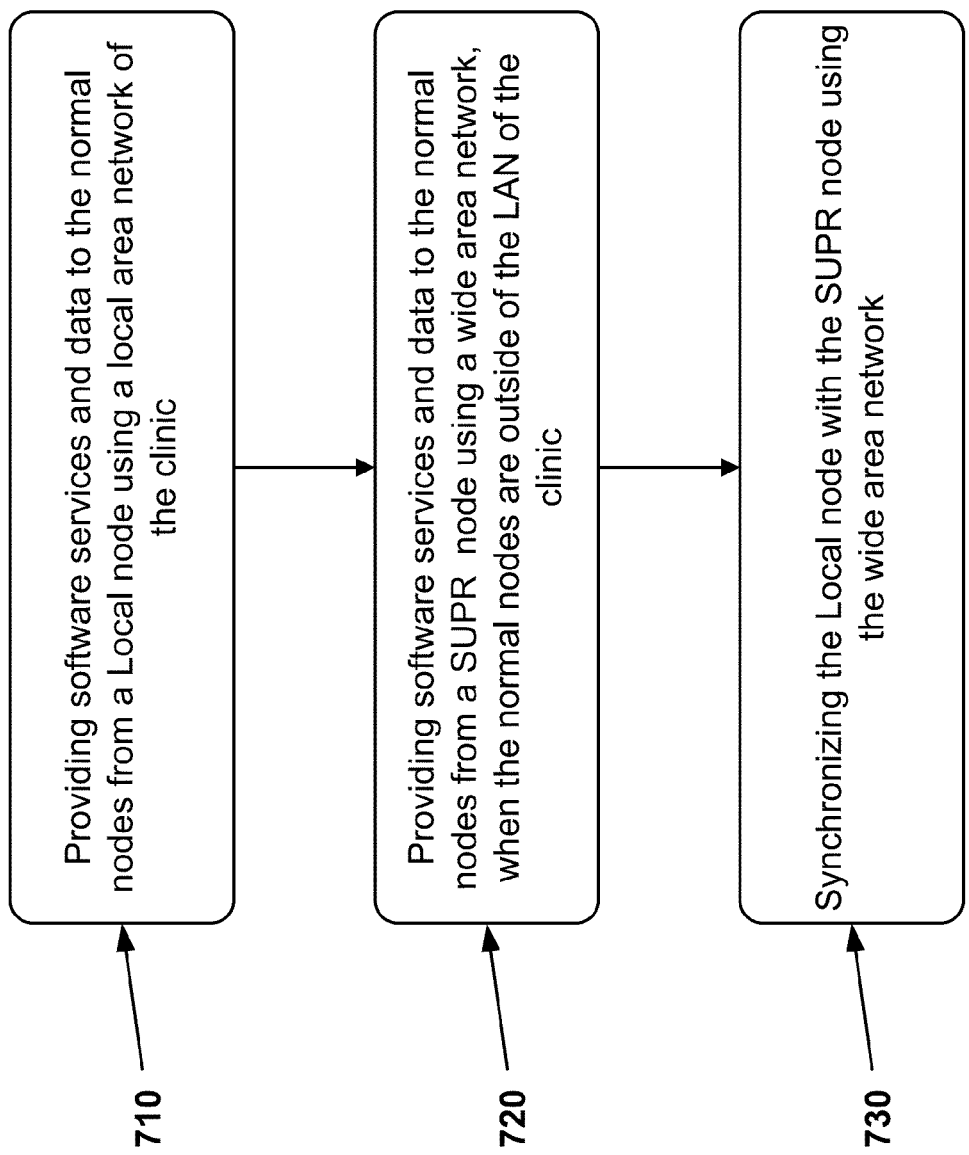
FIG. 7 is a flowchart of a method for providing Hybrid On Demand (HOD) software services between a SUPR node and plurality of nodes including a local node and normal nodes in accordance with an embodiment.

FIG. 7 is a flowchart of a method for providing Hybrid On Demand (HOD) software services between a SUPR node and plurality of nodes including a local node and normal nodes in accordance with an embodiment. Step 710 includes providing software services to the normal nodes from a local node using a local area network. Step 720 includes providing software services to the normal nodes from a SUPR node using a wide area network, when providing software services from the local node is not possible. Step 730 includes synchronizing the local node with the SUPR node using the wide area network.

Figure 8:
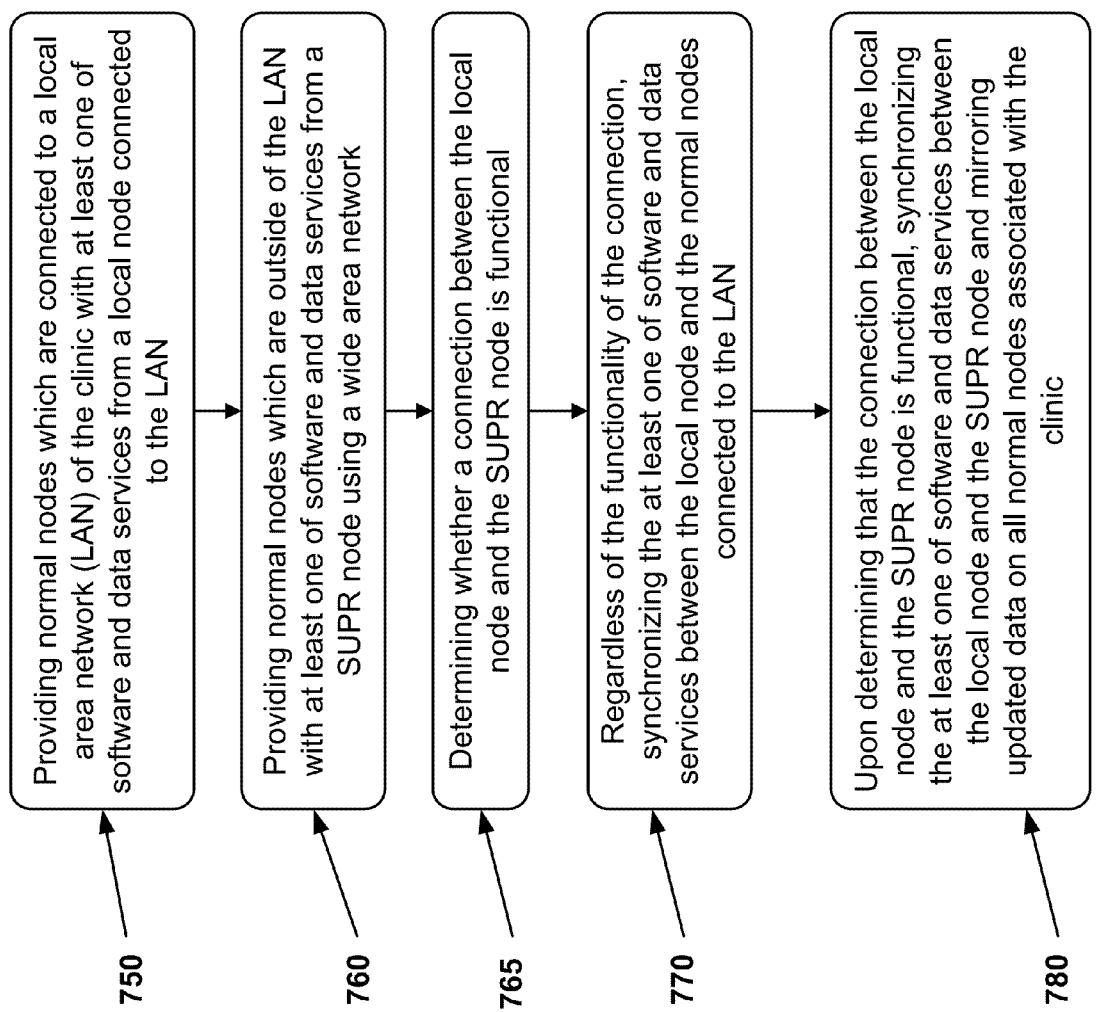
FIG. 8 is a flowchart of a method for providing Hybrid On Demand (HOD) software and data services to a plurality of normal nodes associated with a clinic.

FIG. 8 is a flowchart of a method for providing Hybrid On Demand (HOD) software and data services to a plurality of normal nodes associated with a clinic. Step 750 comprises providing normal nodes which are connected to a local area network (LAN) of the work unit with at least one of software and data services from a local node connected to the LAN, the local node acting as the parent node of the normal nodes connected to the LAN. Step 760 comprises providing normal nodes which are outside of the LAN with at least one of software and data services from a SUPR node using a wide area network, the SUPR node acting as the parent node of the normal nodes outside the LAN. Step 765 comprises determining whether a connection between the local node and the SUPR node is functional. Step 770 comprises regardless of the functionality of the connection, synchronizing the at least one of software and data services between the local node and the normal nodes connected to the LAN. Step 780 comprises upon determining that the connection between the local node and the SUPR node is functional, synchronizing the at least one of software and data services between the local node and the SUPR node and mirroring the synchronized at least one of software and data services on all normal nodes associated with the work unit.

Figure 9:
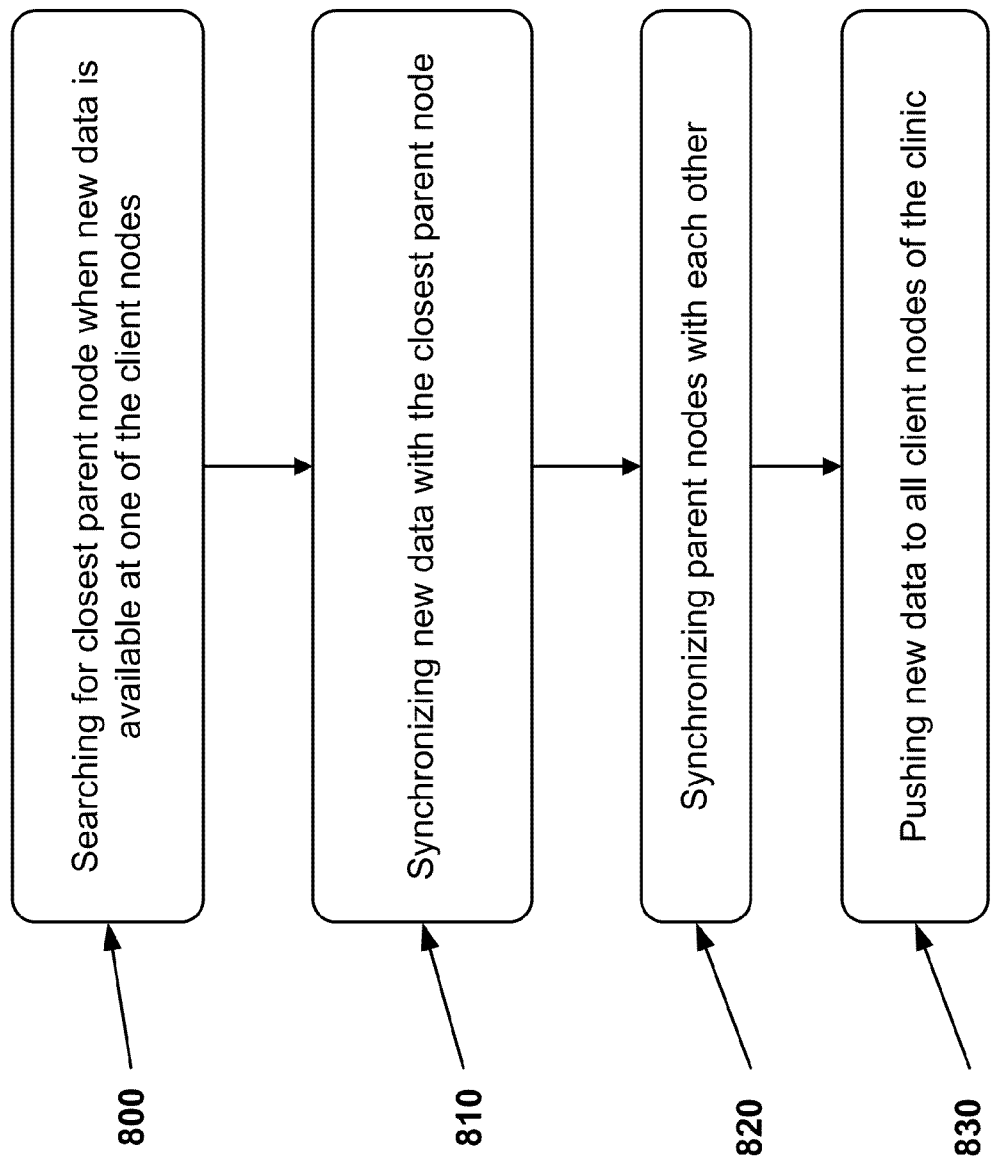
FIG. 9 is a flowchart of a method for synchronizing healthcare data in a cache cloud environment comprising client nodes associated with a clinic and parent nodes comprising a SUPR node accessible via a wide area network (WAN) and a local node accessible via a local area network (LAN), in accordance with an embodiment.

FIG. 9 is a flowchart of a method for synchronizing healthcare data in a cache cloud environment comprising client nodes associated with a clinic and parent nodes, the parent nodes comprising a SUPR node accessible via a wide area network (WAN) and a local node accessible via a local area network (LAN). Step 800 includes searching for closest parent node when new data is available at one of the client nodes. Step 810 includes synchronizing new data with the closest parent node. Step 820 comprises synchronizing parent nodes with each other. Step 830 comprises pushing new data to all client nodes of the clinic.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

While preferred embodiments have been described above and illustrated in the accompanying drawings, it will be evident to those skilled in the art that modifications may be made therein without departing from the scope of this disclosure. Such modifications are considered as possible variants comprised in the scope of the disclosure.

The invention claimed is:

1. A method for providing Hybrid On Demand (HOD) software and data services to a plurality of normal nodes associated with a work unit, the method comprising:
 providing a first set of normal nodes which are connected to a local area network (LAN) of the work unit with at least one of software and data services from a local node connected to the LAN, the local node acting as the parent node of the first set of normal nodes connected to the LAN;
 providing a second set of normal nodes which are outside of the LAN with at least one of software and data services from a SUPR node outside the LAN using a wide area network, the SUPR node acting as the parent node of the second set of normal nodes outside the LAN;
 determining whether a connection between the local node and the SUPR node is present;
 regardless of the presence of the connection, synchronizing the at least one of software and data services between the local node and the first set of normal nodes connected to the LAN; and
 upon determining that the connection between the local node and the SUPR node is present, synchronizing the at least one of software and data services between the local node and the SUPR node and mirroring the synchronized at least one of software and data services on all normal nodes associated with the work unit.

2. The method of claim 1, further comprising determining whether a local node is functional and upon determination that the local node is not functional, synchronizing the at least one of software and data services of the first set of normal nodes with the SUPR node.

3. The method of claim 1, wherein mirroring further comprises pushing updated data from at least one of the local node and SUPR node to all of the normal nodes after synchronizing the local node with the SUPR node.

4. The method of claim 1, further comprising:
 synchronizing the SUPR node with different local nodes of different work units; and
 filtering data pertaining to other work units from synchronization.

5. The method of claim 4, further comprising:
 assigning an identity (ID) to each of the normal nodes and local node of each work unit;
 identifying the work unit to which the nodes belong based on the ID of the nodes; and
 synchronizing only the data associated with the work unit to which the nodes belong.

6. The method of claim 5, further comprising:
 assigning more than one ID to each normal node;
 linking each ID of the normal node to a login information used for authentication;
 whereby, one normal node may be used with more than one work unit without transferring data pertaining to one work unit to another work unit.

7. The method of claim 1, further comprising governing frequencies of software and data service provision and synchronization by a set of synchronization rules embedded in each of the normal nodes, local node, and SUPR node.

8. The method of claim 1, further comprising providing a user interface (UI) and configuring HOD as a service running independently of whether a user is logged into the UI or not.

9. The method of claim 8, wherein the normal nodes comprise computing devices.

10. The method of claim 1, wherein the wide area network comprises the internet, a wireless network, or a combination thereof.

* * * * *